United States Patent
Bennette (10) Patent No.: US 8,853,971 B2
(45) Date of Patent: Oct. 7, 2014

(54) COLOR CONTROL SYSTEM, INTERFACE, AND METHOD FOR CONTROLLING THE OUTPUT OF LIGHT SOURCES

(75) Inventor: Adam Bennette, London (GB)

(73) Assignee: Electronic Theatre Controls, Inc., Middleton, WI (US)

( * ) Notice: Subject to any disclaimer, the term of this patent is extended or adjusted under 35 U.S.C. 154(b) by 913 days.

(21) Appl. No.: 12/956,586

(22) Filed: Nov. 30, 2010

(65) Prior Publication Data

US 2011/0127930 A1  Jun. 2, 2011

Related U.S. Application Data

(60) Provisional application No. 61/265,162, filed on Nov. 30, 2009.

(51) Int. Cl.
*H05B 37/00* (2006.01)

(52) U.S. Cl.
USPC ........ 315/312; 315/185 S; 315/291; 315/324; 315/209 R (58) Field of Classification Search
USPC ........... 315/185 S, 224, 209 R, 291, 307–326
See application file for complete search history.

(56) References Cited

U.S. PATENT DOCUMENTS

| 8,159,150 B2 * | 4/2012 | Ashdown et al. ............ 315/307 |
| 2005/0047134 A1 | 3/2005 | Mueller et al. |

FOREIGN PATENT DOCUMENTS

| WO | 2008/068713 | 6/2008 |
| WO | 2008/072138 | 6/2008 |
| WO | 2011/066543 | 6/2011 |

OTHER PUBLICATIONS

International Preliminary Report on Patentability for Application No. PCT/US2010/058344 dated Feb. 8, 2012 (6 pages).
International Search Report and Written Opinion for Application No. PCT/US2010/058344 dated Mar. 10, 2011 (10 pages).
European Patent Office Action for Application No. 10800797.2 dated Apr. 17, 2014 (5 pages).

* cited by examiner

*Primary Examiner* — Tuyet Thi Vo
(74) *Attorney, Agent, or Firm* — Michael Best & Friedrich LLP (57) ABSTRACT

Systems, interfaces, and methods for controlling a luminaire. The luminaire includes a plurality of light sources or emitters corresponding to different characteristics of light. Color controls corresponding to pre-defined characteristics are set or modified by one or more dials, faders, or similar interface devices. Each of the color controls correspondingly controls the output of one or more of the light sources. A separation between the preset characteristic for each color control and the actual characteristic of each light source is calculated. An output value for each light source that is required to generate the selected characteristic is then calculated and stored in memory. When one or more color controls are selected, the output values of each light source required to reproduce the desired characteristic is determined, and the light sources in the luminaire are driven at the corresponding output values.

13 Claims, 6 Drawing Sheets

COLOR CONTROL SYSTEM, INTERFACE, AND METHOD FOR CONTROLLING THE OUTPUT OF LIGHT SOURCES

RELATED APPLICATIONS

This application claims the benefit of previously-filed, co-pending U.S. Provisional Patent Application No. 61/265,162, filed Nov. 30, 2009, the entire content of which is hereby incorporated by reference.

FIELD OF THE INVENTION

The invention relates to systems, methods, and interfaces for controlling the output color of a luminaire that includes a plurality of monochromatic light sources or color filters.

BACKGROUND

Early full-color light emitting diode ("LED") luminaires included red, green, and blue LEDs. These LEDs were of poor quality, had low output powers, and suffered from highly-variable performance characteristics. Since the introduction of the first full-color LED luminaires, advancements in LED technology have produced luminaires that include additional light sources and are capable of providing higher output powers.

Luminaires that include multiple light sources have conventionally been controlled using three basic techniques. The first technique uses simple controls to allow a user to adjust each color source individually. The user is able to modify the intensity value of each light source from, for example, zero to full-scale using separate controls, such as linear faders, dials, or a numeric keypad. Controlling the output of a luminaire in such a manner requires a user to have knowledge of color theory and the manner in which light combines in order to obtain a desired color output. Such a control technique has practical limitations which limit its use to relatively simple color systems (e.g., three light source systems). The second technique involves controlling the hue, saturation, and intensity ("HSI") of a luminaire using three separate controls or a graphical color map of a color space. The HSI technique allows the user to pick a color within the color space between three points (i.e., a color within the triangle defined by the positions of the red, green, and blue light sources within the color space, or the positions of the secondary colors cyan, magenta, and yellow within the color space). The third technique involves a list of commonly named or numbered colors which correspond to lighting filters (i.e., gels) that are used in theatre and television lighting. The user selects a name or number of a desired color, which is subsequently looked up in a table of component color values.

Each of the above techniques is based on a three color system, and the three colors available in such systems are used to generate each color output. Such systems are commonly used in TV cathode ray tubes ("CRTs"), flat panel displays, and variable color luminaires.

SUMMARY

The three color mixing techniques described above are ubiquitous among multiple light source luminaires, but suffer from important drawbacks: (1) each of the three techniques is unable to properly represent all of the colors perceptible to the human eye. The gamut of colors that are perceptible to the human eye is not a triangle with flat sides, but rather a triangle with lobes. The colors which fall in the lobes cannot be properly reproduced using only three sources; (2) an effect known as metamerism causes colors produced using three-color systems to be distorted when viewed on objects that are not white; and (3) real world colors are complex mixtures of frequencies from all parts of the visible spectrum of light. Systems that are only able to select a single dominant color with a varying degree of saturation to white are unable to accurately represent all of the colors that are perceptible to the human eye.

To overcome the limitations of three-color systems, additional monochromatic light sources are positioned at intermediate spectral positions (e.g., intermediate wavelengths) between the primary RGB points. By adding additional monochromatic light sources, luminaires are capable of producing a wider color gamut and a more continuous spectrum of light while reducing the effects of metamerism. Although adding additional monochromatic light sources cures some deficiencies of earlier systems, the addition also creates new problems. The control techniques described above are unable to exploit the full potential of devices that include more than three light sources. The addition of monochromatic light sources causes an exponential increase in the complexity of controlling the light sources to produce a desired output color. Attempting to control each of the light sources individually results in such complex interactions that the user will have a difficult time reproducing a desired color. For example, the HSI technique is still only able to select one color having a dominant hue and a degree of saturation to white. The techniques described above are incapable of being used to generate colors consisting of several hues that each have a variable degree of saturation.

In one implementation, the invention provides a method of controlling a luminaire. The luminaire includes a plurality of light sources or emitters having different characteristics (e.g., wavelength, optical power, frequency, intensity, polarization, phase, etc.). The light sources are controlled using a set of color controls. The color controls correspond to pre-defined characteristics which do not necessarily coincide with the characteristics of the light sources (e.g., the preset wavelength of the color control is different than the output wavelengths of the actual light sources). For example, the color controls can include more controls than there are light sources. Alternatively, the color controls include fewer controls than there are light sources. The color controls are set or modified by one or more dials, faders, or similar user interface devices. Each of the color controls correspondingly controls the output of one or more of the light sources. For example, a spectral distance between the preset wavelength for each color control and the actual spectral wavelength of each light source is calculated. An output value (e.g., a proportion, a percentage, a decimal value, a fraction, an integer value, a ratio, etc.) for each light source that is required to generate the selected color control are calculated and stored in a memory. As such, when a particular color control is selected, the output values of each light source required to reproduce the desired color are retrieved from memory, and the light sources in the luminaire are driven at the corresponding output values. Combinations of color controls are also used to generate more complex color combinations. In such an instance, the stored output values can be modified by a color control value. If more than one output value for a light source results from the combination of color controls, the output values are combined or normalized to produce a single drive level for the light source.

In another implementation, the invention provides a method of controlling the output of a first light source and a second light source, both of which are within a light fixture.

The method includes receiving a control input signal having a control level and corresponding to a control input characteristic, determining a first separation value based on a first separation between the control input characteristic and an output characteristic associated with the first light source, and determining a second separation value based on a second separation between the control input characteristic and an output characteristic associated with the second light source. The method also includes setting a first light source output value for the first light source based on the first separation value, setting a second light source output value for the second light source based on the second separation value, and controlling an output of the first light source based on the first light source output value and an output of the second light source based on the second light source output value.

In another implementation, the invention provides a method of controlling the output of a light source within a light fixture. The method includes receiving a first control input signal having a first control level and corresponding to a first control input characteristic, receiving a second control input signal having a second control level and corresponding to a second control input characteristic, determining a first separation value associated with a first separation between the first control input characteristic and an output characteristic of the light source, and determining a second separation value associated with a second separation between the second control input characteristic and the output characteristic of the light source. The method also includes setting a first light source output value based on the first separation value, setting a second light source output value based on the second separation value, and controlling an output of the light source based on the first light source output value and the second light source output value.

In one construction, the invention provides a system for controlling the output of an LED within a light fixture. The system includes a first control input device, a second control input device, and a controller. The first control input device is configured to control a first control level associated with a first control input characteristic. The second control input device is configured to control a second control level associated with a second control input characteristic. The controller is configured to determine a first separation value associated with a first separation between the first control input characteristic and an output characteristic of the LED, determine a second separation value associated with a second separation between the second control input characteristic and the output characteristic of the LED, determine a first LED output value based on the first separation value, and determine a second LED output value based on the second separation value. The controller is also configured to control an output of the LED based on the first LED output value and the second LED output value.

Other aspects of the invention will become apparent by consideration of the detailed description and accompanying drawings.

DETAILED DESCRIPTION

Before any implementations of the invention are explained in detail, it is to be understood that the invention is not limited in its application to the details of construction and the arrangement of components set forth in the following description or illustrated in the following drawings. The invention is capable of other implementations and of being practiced or of being carried out in various ways.

The invention described herein relates to systems, methods, and interfaces for controlling a luminaire and an output of the luminaire. The luminaire includes a plurality of light sources or emitters (e.g., light emitting diodes ("LEDs")), each source having different output characteristics (e.g., wavelength, optical power, frequency, intensity, polarization, phase, etc.). Color controls corresponding to pre-defined colors (e.g., red, orange, yellow, lime, green, turquoise, cyan, blue, indigo, violet, etc.) or other characteristics are set or modified by one or more dials, faders, or similar interface devices. Each of the color controls correspondingly controls the output of one or more of the light sources. For example, a separation (e.g., a distance) between an input characteristic (e.g., a wavelength) for each of the color controls and the output characteristic (e.g., wavelength) of each light source is calculated. The separation is calculated, for example, as a difference between the two wavelengths (e.g., in nanometers ("nm")). An output value (e.g., output intensity percentage, proportion value, etc.) for each light source that is required to generate the desired color is then calculated and stored in memory. When one or more color controls are selected, the output values of each light source required to reproduce the desired color are determined, and the light sources in the luminaire are driven at the corresponding output values. When a single color control is selected, the single color control may control outputs corresponding to a plurality of light sources within the luminaire. Additionally, when multiple color controls are selected, each of the selected color controls may control, at least in part, the output of a single light source within the luminaire.

In general, the input characteristics of the color controls and output characteristics of the light sources are congruent (e.g., the input characteristic and the output characteristic are both wavelengths). However, various conversions or metrics can also be used to associate one characteristic with another (e.g., frequency and wavelength). For descriptive purposes, the implementations and constructions of the invention described herein are described with respect to the input characteristic of the color controls and the output characteristic of the light sources being wavelengths, but the invention can also be implemented using other characteristics. Wavelength is used herein to describe the spatial period of a wave, or with respect to the electromagnetic spectrum, a point on the electromagnetic spectrum that corresponds to a color or a particular type of electromagnetic radiation. Additionally, the separation between the input characteristic of the color controls and the output characteristics of the light sources, and the corresponding separation values, are described herein with respect to distances (e.g., spectral distances). However, the separations can also be based on, for example, ratios, products, sums, or differences between wavelengths, optical powers, frequencies, intensities, polarizations, phases, etc., and correspond generally to an intervening space or gap between points, values, quantities, objects, locations, and the like.

Separation values are based on the separations and can be, for example, numeric values, null values, etc.

Figure 1:
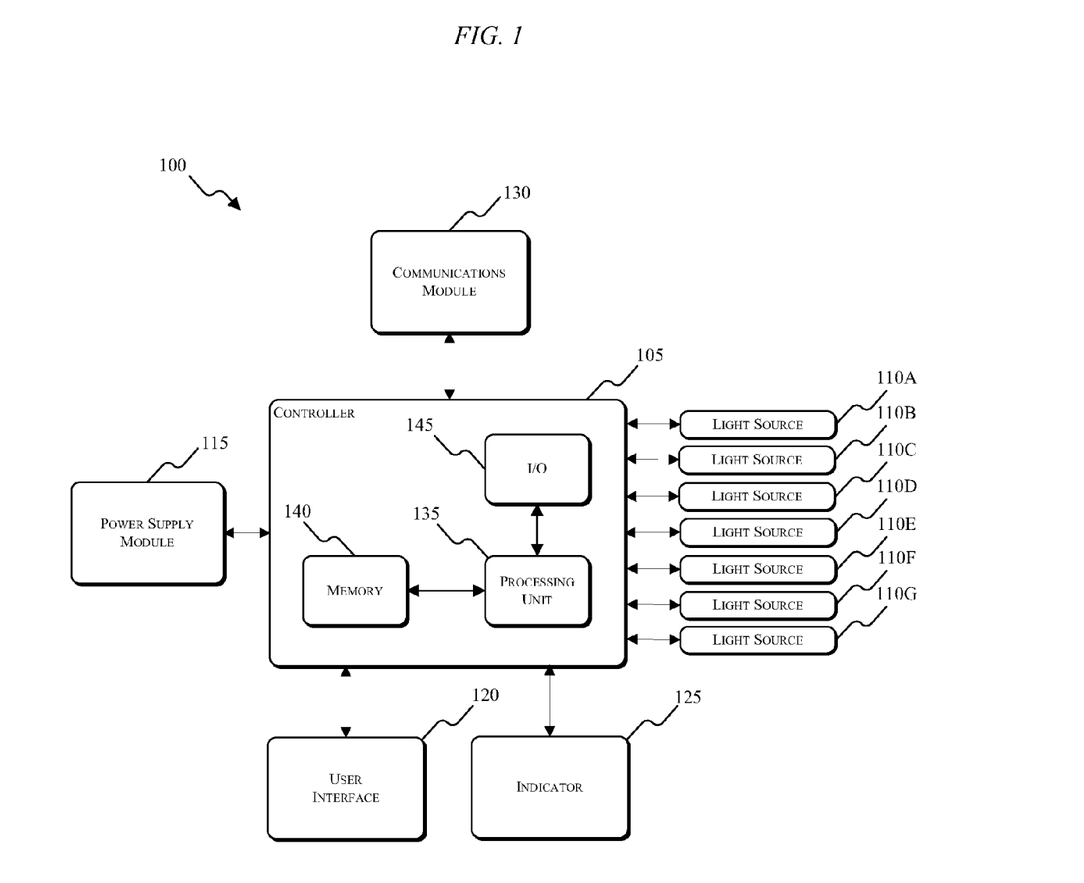
FIG. 1 is a block diagram of a luminaire.

In some implementations, luminaires are used in, for example, a theatre, a hall, an auditorium, a studio, or the like. Each luminaire 100 includes, among other things, a controller 105, a plurality of light sources 110A-110G, a power supply module 115, a user interface 120, one or more indicators 125, and a communications module 130, as shown in FIG. 1. In the illustrated construction, the luminaire 100 includes seven light sources 110A-110G. Each light source is configured to generate light at a specific wavelength or range of wavelengths. For example, the light sources 110A-110G generate light corresponding to the colors red, red-orange, amber, green, cyan, blue, and indigo. In other constructions, light sources that generate different colors are used (e.g., violet, yellow, etc.), or different numbers or combinations of light sources are used. For example, in other constructions, the controller 105 is connected to red, green, and blue ("RGB") light sources, red, green, blue, and amber ("RGBA") light sources, red, green, blue, and white ("RGBW") light sources, or other combinations of light sources. A seven light source implementation is illustrated because it is operable to reproduce substantially the entire spectrum of visible light. In other implementations, eight or more light sources are used to further enhance the luminaire 100's ability to reproduce the spectrum of visible light.

The controller 105 includes, or is connected to an external device (e.g., a computer), which includes combinations of software and hardware that are operable to, among other things, control the operation of the luminaire 100, control the output of each of the light sources 110A-110G, and activate the one or more indicators 125 (e.g., LEDs or a liquid crystal display ("LCD")). In one construction, the controller 105 or external device includes a printed circuit board ("PCB") (not shown) that is populated with a plurality of electrical and electronic components that provide power, operational control, and protection to the luminaire 100. In some constructions, the PCB includes, for example, a processing unit 135 (e.g., a microprocessor, a microcontroller, or another suitable programmable device), a memory 140, and a bus. The bus connects various components of the PCB including the memory 140 to the processing unit 135. The memory 140 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 135 is connected to the memory 140 and executes software that is capable of being stored in the RAM (e.g., during execution), the ROM (e.g., on a generally permanent basis), or another non-transitory computer readable medium such as another memory or a disc. Additionally or alternatively, the memory 140 is included in the processing unit 135. The controller 105 also includes an input/output ("I/O") system 145 that includes routines for transferring information between components within the controller 105 and other components of the luminaire or lighting system. For example, the communications module 130 is configured to provide communications between the luminaire 100 and one or more additional luminaires or a control device within a lighting system.

Software included in the implementation of the luminaire 100 is stored in the memory 140 of the controller 105. The software includes, for example, firmware, one or more applications, program data, one or more program modules, and other executable instructions. The controller 105 is configured to retrieve from memory and execute, among other things, instructions related to the control processes and methods described below. In one construction, the memory 140 includes a table of stored spectral distances and output proportions for the light sources 110A-110G. For example, the controller 105 is configured to execute instructions retrieved from the memory 140 for performing a mathematical transformation of a color control value to an output proportion value that is required to drive the light sources 110A-110G to produce a desired color. In other constructions, the controller 105 or external device includes additional, fewer, or different components.

The PCB also includes, among other things, a plurality of additional passive and active components such as resistors, capacitors, inductors, integrated circuits, and amplifiers. These components are arranged and connected to provide a plurality of electrical functions to the PCB including, among other things, filtering, signal conditioning, and voltage regulation. For descriptive purposes, the PCB and the electrical components populated on the PCB are collectively referred to as the controller 105.

The power supply module 115 supplies a nominal AC or DC voltage to the luminaire 100. The power supply module 115 is powered by mains power having nominal line voltages between, for example, 100V and 240V AC and frequencies of approximately 50-60 Hz. The power supply module 115 is also configured to supply lower voltages to operate circuits and components within the luminaire 100. In other constructions, the luminaire 100 is powered by one or more batteries or battery packs.

The user interface 120 is used to control the luminaire 100 or the operation of a lighting system as a whole. For example, the user interface 120 is operably coupled to the controller 105 to control the output of the light sources 110A-110G. The user interface 120 can include a combination of digital and analog input devices required to achieve a desired level of control for the luminaire. For example, the user interface 120 can include a computer having a display and input devices, a touch-screen display, a plurality of knobs, a plurality of dials, a plurality of switches, a plurality of buttons, or the like.

In one construction, the user interface 120 includes a lighting controller interface (e.g., a color equalizer interface). The lighting controller interface includes color controls that are used to vary the intensities of a plurality of colors continuously from zero to a maximum value (e.g., full-scale). The controller interface can be used with emissive systems such as systems employing multiple LEDs or similar monochromatic light sources. Additionally or alternatively, the controller interface may be used with subtractive systems employing high-pass, low-pass, and/or band-pass filters. As such, the terms emitter or light source may be substituted with "filtered light source" throughout the description. The implementations of the invention described herein are described with respect to the use of additive light sources.

Each of the color controls is fixed by its name (i.e., the name of a color) irrespective of the actual light source or light sources being controlled. As a result, the controller interface is configured to control a variety of luminaires in a consistent way, and operate any multi-source luminaire regardless of the number of light sources or their characteristics. The controller interface includes, for example, ten color controls and is configured to operate, for example, seven light sources having different characteristics. The controller interface includes faders, dials, wheels, or the like to allow a user to control the output of the color luminaire. Additional controls can be provided to control, for example, the output of white light.

The color controls are identified by fixed names and each is used to control a fixed color output. As an illustrative example, the controls are identified as red, orange, yellow, lime, green, turquoise, cyan, blue, indigo, and violet. In other constructions, the number of controls and light sources is different or re-configurable (e.g., light sources or controls can be added or removed), and the control of the light sources using the controller interface is independent of the number of light sources included in the luminaire. The control methodology described herein is universal and can be used to generate colors throughout the entire visible spectrum, even though current devices may not have the ability to achieve the extremes of the visual spectrum (e.g., deep red and violet). The color controls identified in the controller interface are generated by mixing the outputs of available light sources to arrive at the identified color. For example, when controlling an RGB device, the color controls can be used to control the output values of a red light source, a green light source, and a blue light source in proportions that produce a yellow color mix. The actual proportions required depend on the wavelengths and intensities of the light sources. If the color controls are operated individually (e.g., one at a time), the luminaire generates the color of the selected color control.

The controller interface is also configured to allow a user to mix each of the color controls in varying proportions. The instructions stored in the memory 140 of the controller 105 are operable to compute the output levels needed from each light source to generate the desired color output. In some implementations, the user is able to create a color output of the luminaire with additional or missing color spectra ranges. For example, compound colors such as Congo blue, which is often used in theatrical productions, is readily created and modified using the controller interface.

Each of the controls in the controller interface is operable to cause a drive level of the light sources near a desired wavelength to be modified according to their spectral distance from the color selected in the control interface. As an illustrative example, the spectral distance is the difference (e.g., in nanometres) between the color control's nominal wavelength and the actual output wavelengths of the light sources.

If the color control is centred at, for example, 500 nm and light sources are centered at 460 nm and 520 nm, then the light source centered at 520 nm is 20 nm away from the desired color control and the light source centered as 460 nm is 40 nm away from the desired color control. To arrive at a luminaire output of 500 nm, the light sources are driven such that the light source that is more distant from the desired color control (i.e., 40 nm away) is half as bright as the close light source (i.e., 20 nm away). As such, the 520 nm light source is driven at 100%, and the 460 nm light source is driven at 50%.

To expand on the above example, if another color control is introduced adjacent to the first color control at, for example, 480 nm, the second color control is 20 nm from the 460 nm light source and 40 nm away from the 520 nm light source. In this instance, the 520 nm light source is driven at 50%, and the 460 nm light source is driven at 100%. The composite result is achieved by weighting the values from the controls and normalising the result. For the light source at 520 nm, the output is 100%+50%=150%, and for the 460 nm light source, the output is 50%+100%=150%. These outputs are normalized and a resultant output of 100% for each light source achieves the combined output of the first and second user selected color controls having a wavelength between 480 nm and 500 nm at 490 nm.

Although the above example is simplified, it is illustrative of one implementation of the invention. Other implementations take into account additional factors such as absolute emitter power, the response of the human eye (i.e., photopic response), and the like which require adjustments to the output levels of the light sources. Compensation factors can be used to compensate for these effects and may be introduced at various stages of the control process. Additionally, as more controls are activated, more complex normalization techniques are used to prevent the introduction of distortion into the output of the luminaire. Such normalization techniques are independent of the inventive controller interface and light source control techniques described herein.

As another illustrative example, ten controls corresponding to ten different wavelengths are used to drive the luminaire 100 that includes the seven groups of LED light sources 110A-110G. The colors corresponding to the controls and their respective wavelengths are provided below in Table #1.

TABLE #1

| Color Controls | |
|---|---|
| Color | Wavelength |
| Red | 640 |
| Orange | 620 |
| Yellow | 590 |
| Lime | 560 |
| Green | 530 |
| Turquoise | 510 |
| Cyan | 490 |
| Blue | 470 |
| Indigo | 450 |
| Violet | 430 |

The colors corresponding to each of the groups of LED light sources in the luminaire and their respective wavelengths are provided below in Table #2.

TABLE #2

| Light Sources | |
|---|---|
| Color | Wavelength |
| Red | 627 |
| Red-Orange | 617 |
| Amber | 590 |
| Green | 535 |
| Cyan | 505 |
| Blue | 470 |
| Indigo | 450 |

From the information provided in Table #1 and Table #2, the distances between the color controls and the light sources can be calculated. The distances are compiled in, for example, tabular form and stored in the memory 140 of the controller 105, as shown below in Table #3.

TABLE #3

| Distances Between Color Controls and Light Sources | | | | | | | | | | | |
|---|---|---|---|---|---|---|---|---|---|---|---|
| Color Control | λ | 640 | 620 | 590 | 560 | 530 | 510 | 490 | 470 | 450 | 430 |
| Red | 627 | 0 | 7 | — | — | — | — | — | — | — | — |
| Red-Orange | 617 | — | 3 | — | — | — | — | — | — | — | — |

TABLE #3-continued

Distances Between Color Controls and Light Sources

| Color Control | λ | 640 | 620 | 590 | 560 | 530 | 510 | 490 | 470 | 450 | 430 |
|---|---|---|---|---|---|---|---|---|---|---|---|
| Amber | 590 | — | — | 0 | 30 | — | — | — | — | — | — |
| Green | 535 | — | — | — | 25 | 5 | 25 | — | — | — | — |
| Cyan | 505 | — | — | — | — | 25 | 5 | 15 | — | — | — |
| Blue | 470 | — | — | — | — | — | — | 20 | 0 | — | — |
| Indigo | 450 | — | — | — | — | — | — | — | — | 0 | 0 |

Each entry in Table #3 contains a NULL value ("-") or the distance in nanometers from the color control to the nearest lower and the nearest higher available light source wavelengths. If the light source exactly matches the color control's wavelength, the distance is shown as zero. At the extremes of the spectrum of visible light, only the nearest emitter is used.

Figure 2:
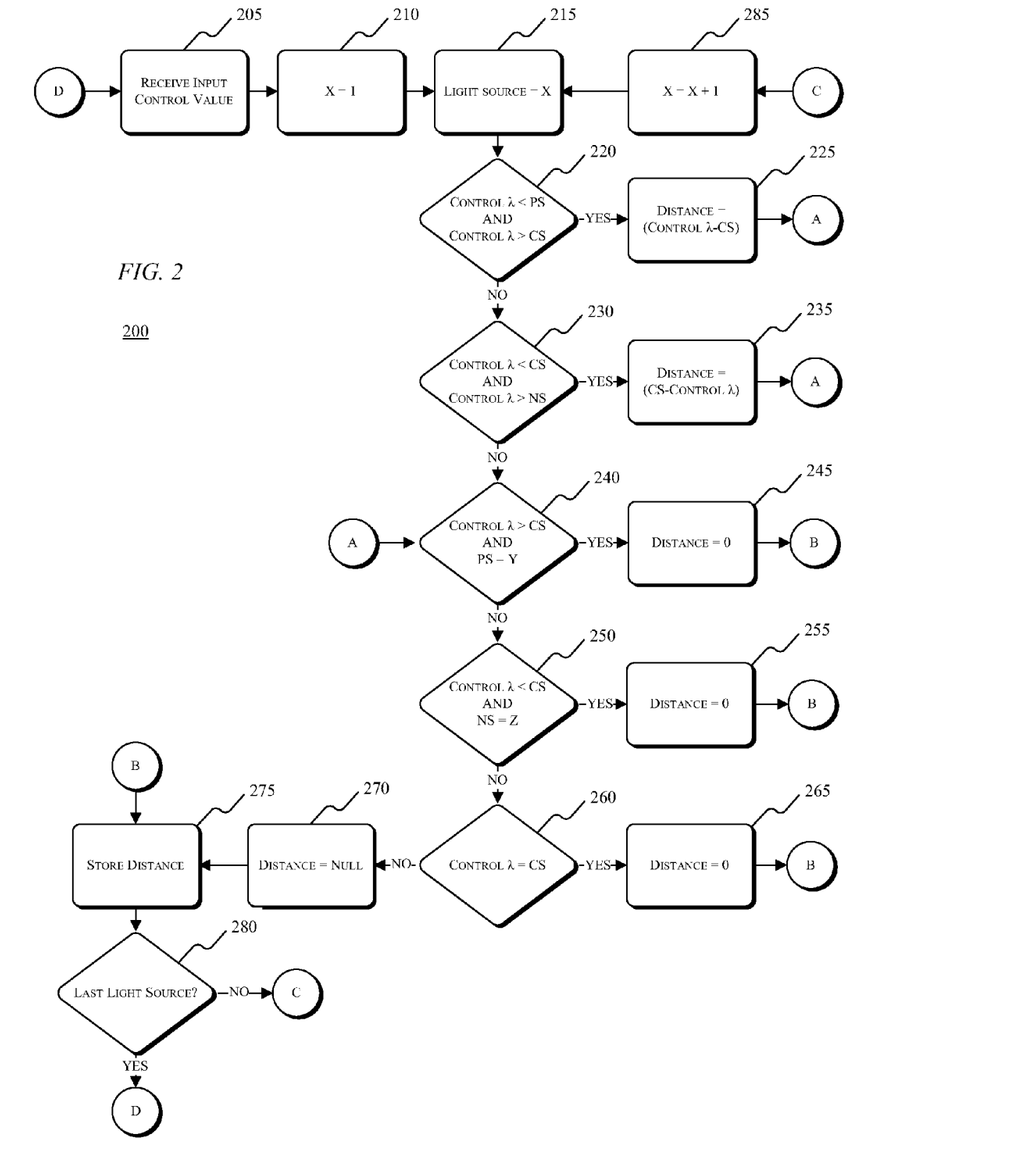
FIG. 2 is a process for determining spectral distances between color controls and light sources.

FIG. 2 illustrates a process 200 for determining the distances between the color controls and the light sources in the light fixture. The process 200 is described iteratively and can be applied to a light fixture having any number of light sources. The process 200 begins when an input control value or wavelength (e.g., a color control) is received (step 205), and a variable, X, is initialized or set to a value of 1 (step 210). A light source or emitter is then set equal to the variable, X (step 215) (i.e., a light source is selected for which a distance calculation is to be made). Following step 215, the input control value, designated as "control λ," is compared to the wavelength of the previous light source ("PS") (i.e., X−1) and a current light source ("CS") (i.e., X). If (1) control λ is less than the wavelength of the PS and (2) control λ is greater than the wavelength of the CS (step 220), the distance for the CS is set equal to the absolute value of the difference between control λ and the wavelength of the CS (step 225), as shown below in EQN. 1. The process 200 then proceeds to section A.

$$\text{DISTANCE} = |(\text{Control } \lambda - CS)| \qquad \text{EQN. 1}$$

If conditions (1) and (2) of step 220 are not satisfied, control λ is compared to the wavelength of the CS and the wavelength of the next light source ("NS") (step 230). If control λ is (1) less than the wavelength of the CS and (2) greater than the wavelength of the NS, the distance for the CS is set equal to the absolute value of the difference between the wavelength of the CS and control λ, as shown below in EQN. 2. The process 200 then proceeds to section A.

$$\text{DISTANCE} = |(CS - \text{Control } \lambda)| \qquad \text{EQN. 2}$$

If conditions (1) and (2) of step 230 are not satisfied, control λ is compared to the CS and a second variable, Y (step 240). If control λ is (1) greater than the wavelength of the CS and (2) the wavelength of the PS is equal to the second variable, Y, the distance for the CS is set equal to zero (step 245). The second variable, Y, is set to an arbitrary value and is used to identify, for example, whether the CS is the first light source for which a distance is being calculated. In some implementations, the second variable, Y, is set to a default value of 1000 (i.e., a wavelength outside of the spectrum of visible light). The process 200 then proceeds to section B.

If conditions (1) and (2) of step 240 are not satisfied, control λ is compared to the CS and a third variable, Z (step 250). If control λ is (1) less than the wavelength of the CS and (2) the wavelength of the NS is equal to the third variable, Z, the distance for the CS is set equal to zero (step 255). The third variable, Z, is set to an arbitrary value and is used to identify, for example, whether the CS is the last light source for which a distance is being calculated. In some implementations, the third variable, Z, is set to a default value of zero (i.e., a wavelength outside of the spectrum of visible light). The process 200 then proceeds to section B.

If conditions (1) and (2) of step 250 are not satisfied, control λ is compared to the CS (step 260). If control λ is equal to the wavelength of the CS, the distance for the CS is set equal to zero (step 265), and the process 200 proceeds to section B. If control λ is not equal to the wavelength of the CS, the distance for the CS is set to NULL (i.e., no numeric value) (step 270). The process 200 then proceeds to step 275 and section B where the value of the distance for the CS is stored to memory (e.g., memory 140). At step 280, the CS is compared to the last light source in the light fixture to determine if any more distances need to be calculated. For example, the variable, X, is compared to the number of light sources in the light fixture (e.g., seven). If the CS is not the last light source in the light fixture, the process 200 proceeds to section C, and the variable, X, is incremented (e.g., X=X+1) (step 285). The light source is then set equal to the new value of the variable, X (step 215) to calculate distance values for the NS. If the CS is the last light source in the light fixture, the process 200 proceeds to section D and waits, for example, for a new control input value to be received (step 205). In some implementations, control input values are received continuously or at regular intervals (e.g., every 20 ms). In other implementations, the process 200 is executed once and the distance values are stored in the memory 140 of the controller 105.

After the table of distances has been generated, the relative proportions of the output values of the various light sources that are needed to generate the desired color control are calculated. These values are inversely proportional to the distance of the light source from the desired color control, so the light source that is closer to the color control is driven at a higher output level. To ensure that the highest possible output is attained when operating a single control, the light source closest to the color control is set to 100% and the other light sources are set correspondingly lower.

If the distance between the color control and the light source is zero (i.e. the light source is aligned with the color control), there is a single output value (e.g., output intensity percentage, proportion value, etc.) corresponding to a full-scale output of that light source, as shown below in Table #4. At the extremes of the visible spectrum, the distance from the color control to the nearest light source is set to zero so the closest light source is also set to a full-scale value. In some implementations, Table #4 is fixed for a given luminaire and the output values are only calculated once. Table #4 can then be saved in a memory of the controller. In other implementations, the values populating Table #4 are recalculated periodically or based on a user request.

TABLE #4

Light Source Output Values

| Color Control | λ | 640 | 620 | 590 | 560 | 530 | 510 | 490 | 470 | 450 | 430 |
|---|---|---|---|---|---|---|---|---|---|---|---|
| Red | 627 | 1.00 | 0.43 | — | — | — | — | — | — | — | — |
| Red-Orange | 617 | — | 1.00 | — | — | — | — | — | — | — | — |
| Amber | 590 | — | — | 1.00 | 0.83 | — | — | — | — | — | — |
| Green | 535 | — | — | — | 1.00 | 1.00 | 0.20 | — | — | — | — |
| Cyan | 505 | — | — | — | — | 0.20 | 1.00 | 1.00 | — | — | — |
| Blue | 470 | — | — | — | — | — | — | 0.75 | 1.00 | — | — |
| Indigo | 450 | — | — | — | — | — | — | — | — | 1.00 | 1.00 |

Figure 3:
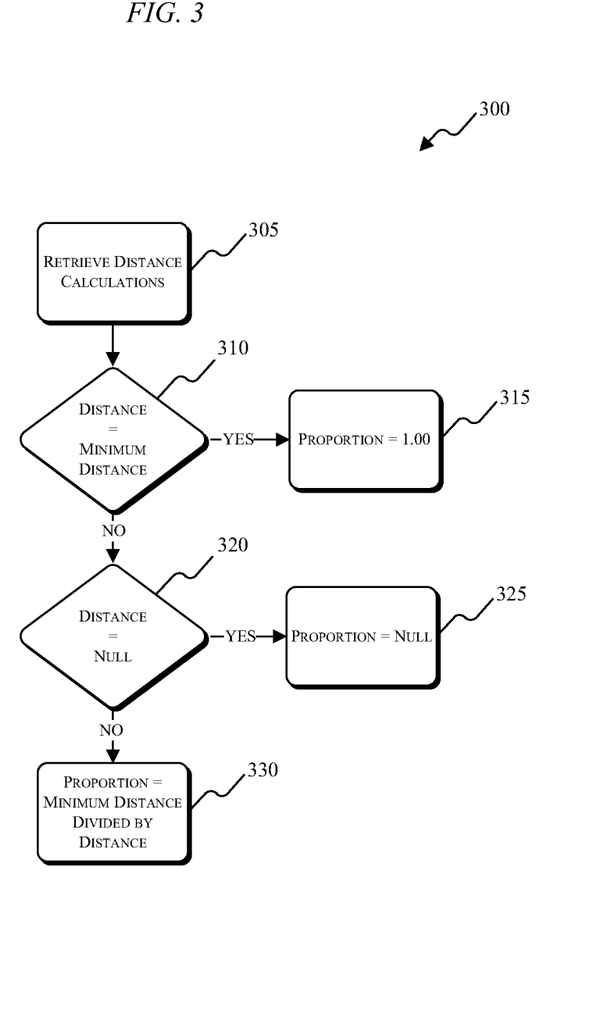
FIG. 3 is a process for calculating an output proportion for a light source.

FIG. 3 illustrates a process 300 for calculating the output values shown in Table #4 for of each light source based on the distances from Table #3. At step 305, the distance calculations for each light source corresponding to each of the control input values are retrieved. The distance calculations or values are retrieved from, for example, a non-volatile memory such as a ROM or a volatile memory such as a RAM. The distance values are converted to output values on a per-column basis. For example, if a distance value for a particular light source is equal to the minimum distance value in a column (step 310), the output value is set equal to 1.00 (e.g., an output of 100%) (step 315). If the distance value is not equal to the minimum distance value in a column, the distance value for a particular light source is compared to a NULL value (i.e., no numeric value) (step 320). If the distance value is NULL, the output value is also set to NULL (i.e., no output) (step 325). If the distance value is not NULL, the output value is set equal to the minimum distance value in the column divided by the distance value for the particular light source (step 330).

As an illustrative example, the color control corresponding to a wavelength of 620 nm has distance values of seven for the red light source and three for the red-orange light source. The remaining light sources have distance values that are NULL. The minimum distance value in the column for the 620 nm color control is the distance for the red-orange light source (e.g., three). As such, the output value of the red-orange light source is set equal to 1.00. The distance value for the red light source is not the minimum distance value in the column and does not have a value of NULL. Therefore the output value is set to a value that is equal to the minimum distance value in the column divided by the distance value for the red light source, as shown below in EQN. 3.

$$\text{OUTPUT PROPORTION} = \frac{3}{7} = .43 \quad \text{EQN. 3}$$

The output values for each light source required to generate the remaining color controls are similarly calculated. After each output value has been determined, the values within Table #4 are saved to, for example, the memory 140 of the controller 105. The output values can be retrieved as necessary based on the color controls selected in the controller interface. If only a single color control is selected, the output values are those values stored in memory. However, if the user selects varying proportions of each color control, the output values stored in memory are modified accordingly.

For example, Table #5 illustrates a situation in which five of the controls are set to various output levels (e.g., percentages). The yellow color control is set to 100%, the lime color control is set to 75%, the green color control is set to 41%, the turquoise color control is set to 63%, the violet color control is set to 43%, and the remaining color controls are set to 0%. Using the method described above, the proportions of the light source outputs required to achieve the desired percentage of each color control are determined or retrieved from memory. Each entry in each column of Table #4 is then multiplied by the desired percentage (i.e., control level) for that color control.

TABLE #5

Control Value Results Table

| | | Control Value (%) | | | | | | | | | |
|---|---|---|---|---|---|---|---|---|---|---|---|
| | | 0 | 0 | 100 | 75 | 41 | 63 | 0 | 0 | 0 | 43 |
| Color Control | λ | 640 | 620 | 590 | 560 | 530 | 510 | 490 | 470 | 450 | 430 |
| Red | 627 | — | — | — | — | — | — | — | — | — | — |
| Red-Orange | 617 | — | — | — | — | — | — | — | — | — | — |
| Amber | 590 | — | — | 1.00 | 0.63 | — | — | — | — | — | — |
| Green | 535 | — | — | — | 0.75 | 0.41 | 0.13 | — | — | — | — |
| Cyan | 505 | — | — | — | — | 0.08 | 0.63 | — | — | — | — |
| Blue | 470 | — | — | — | — | — | — | — | — | — | — |
| Indigo | 450 | — | — | — | — | — | — | — | — | — | 0.43 |

The control value results table represented by Table #5 is computed in real-time for each refresh cycle of the luminaire. A final results table collects the light source output values from each row in the control results table and combines them into a single value for each light source in the luminaire. The light source output values can be combined using a variety of techniques. The various techniques for combining light source output values produce different errors and inaccuracies. In some implementations, the controller 105 selects a method based on a preset value, criterion, preference, threshold, or the like. In other implementations, one or more combination techniques are provided to a user, and the user selects the most desirable of the combination options.

In one implementation, the result is chosen using a "highest-takes-precedence" rule. In such an implementation, the highest light source output value in each row is retained as the resultant output value for that light source. The results of the highest-takes-precedence implementation are shown below in Table #6.

TABLE #6

Raw Results for Each Light Source

| Color | Wavelength | Value |
|---|---|---|
| Red | 627 | 0 |
| Red-Orange | 617 | 0 |
| Amber | 590 | 1.00 |
| Green | 535 | 0.75 |
| Cyan | 505 | 0.63 |
| Blue | 470 | 0 |
| Indigo | 450 | 0.43 |

In another implementation, the light source output values for each row are summed and the result is clipped to a maximum value of 1.00 (i.e., full-scale). The results of the clipped sum implementation are shown below in Table #7.

TABLE #7

Raw Clipped Sum Results for Each Light Source

| Color | Wavelength | Value |
|---|---|---|
| Red | 627 | 0 |
| Red-Orange | 617 | 0 |
| Amber | 590 | 1.00 |
| Green | 535 | 1.00 |
| Cyan | 505 | 0.71 |
| Blue | 470 | 0 |
| Indigo | 450 | 0.43 |

In another implementation, the light source output values for each row are summed and the result is normalized by scaling all of the results so that the highest sum total corresponds to an output value of 1.00 (i.e., full-scale). For example, the combined output for each row is divided by the output for the row that has the greatest sum (e.g., 1.63 in Table #8). The results of the normalized sum implementation are shown below in Table #8.

TABLE #8

Raw Normalized Results for Each Light Source

| Color | Wavelength | Summed | Normalized |
|---|---|---|---|
| Red | 627 | 0 | 0 |
| Red-Orange | 617 | 0 | 0 |
| Amber | 590 | 1.63 | 1.00 |
| Green | 535 | 1.29 | 0.79 |
| Cyan | 505 | 0.71 | 0.44 |
| Blue | 470 | 0 | 0 |
| Indigo | 450 | 0.43 | 0.26 |

Each of the above techniques generates a composite result that corresponds to a final desired color, but each also includes an error or degree of inaccuracy. In some implementations, the error is calculated for each technique and the technique that produces the lowest error is selected.

In another implementation of the invention, the controller interface is used to adjust the outputs of a plurality of light sources to generate white light. In addition to the light sources described above, some luminaires also include white light sources which can be directly controlled. If the luminaire does not include white light sources, the light sources must be operated proportionally to produce the desired white light output of the luminaire. In such an implementation, a data table for the luminaire that includes drive levels for each of the light sources in the luminaire is used to produce white light. In one construction, two controls are provided for white light. A first color control produces a warm white light that corresponds to a tungsten light with a color temperature of approximately 2900-3500 Kelvin. A second color control produces a cool white light that corresponds to natural daylight having a color temperature of approximately 5000-7000 Kelvin.

If a luminaire includes one or more of the warm white light or cool white light sources, the corresponding controls in the controller interface control the intensity of the light source directly. If a luminaire does not include one or more of the warm white light and cool white light sources, white light is produced by mixing appropriate proportions of the colored light sources. For example, the color controls can be proportionally scaled as described above based on values stored in memory. Table #9 provides the color control intensity levels for the ten control luminaire described above that are required to generate both a warm white light output and a cool white light output.

TABLE #9

Values to Produce White by Color Mixing

| Color | Wavelength | Warm White Values | Cool White Values |
|---|---|---|---|
| Red | 640 | 1.00 | 1.00 |
| Orange | 620 | 1.00 | 1.00 |
| Yellow | 590 | 1.00 | 1.00 |
| Lime | 560 | 0.90 | 0.90 |
| Green | 530 | 0.83 | 0.86 |
| Turquoise | 510 | 0.70 | 0.77 |
| Cyan | 490 | 0.42 | 0.51 |
| Blue | 470 | 0.40 | 0.50 |
| Indigo | 450 | 0.30 | 0.47 |
| Violet | 430 | 0.25 | 0.42 |

Figure 4:
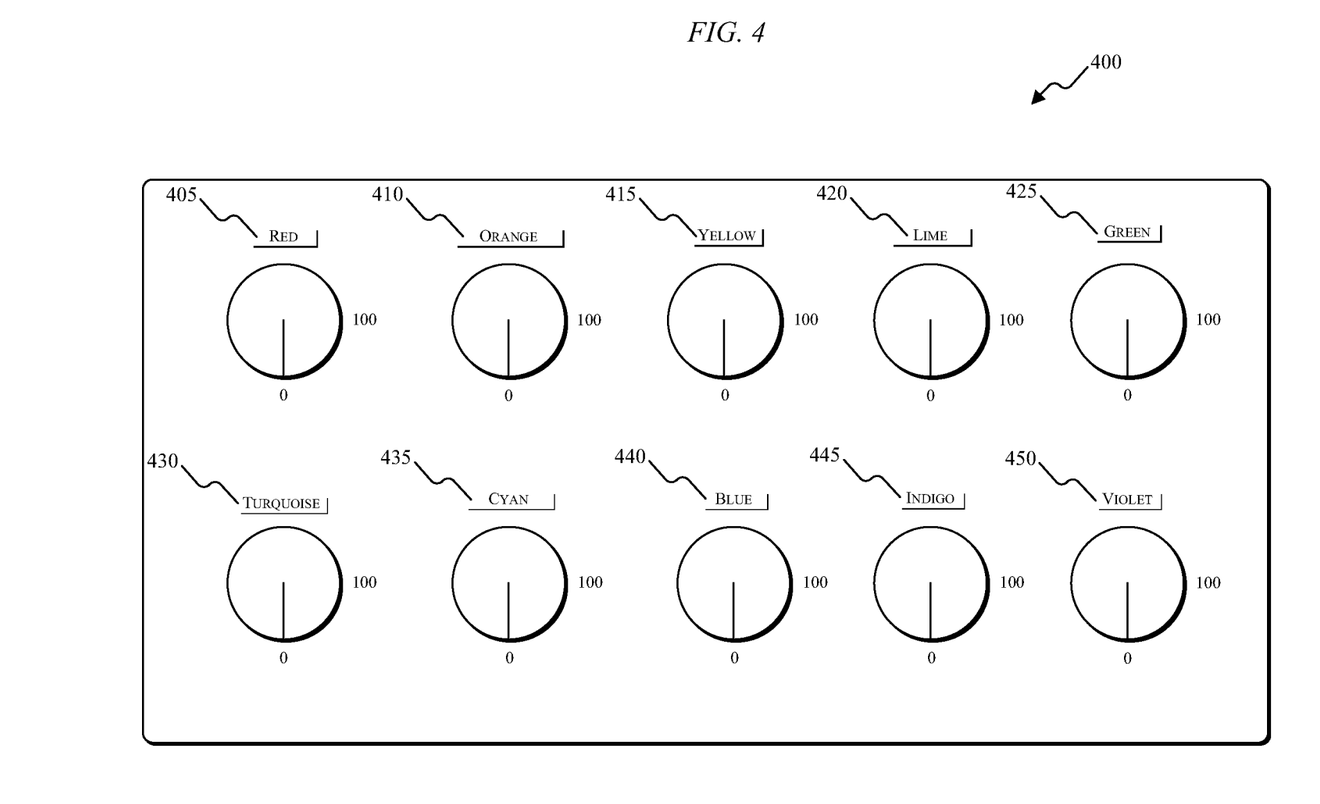
FIG. 4 illustrates a user control interface according to one construction of the invention.
Figure 5:
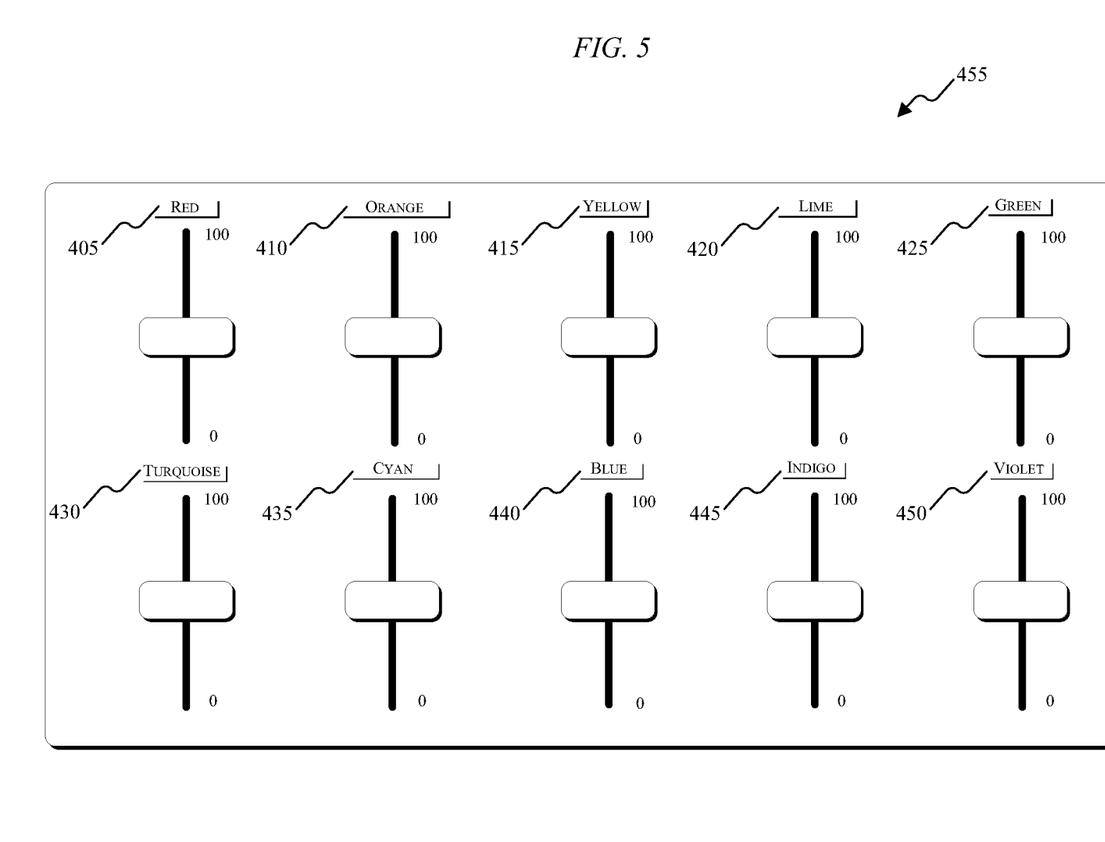
FIG. 5 illustrates a user control interface according to another construction of the invention.
Figure 6:
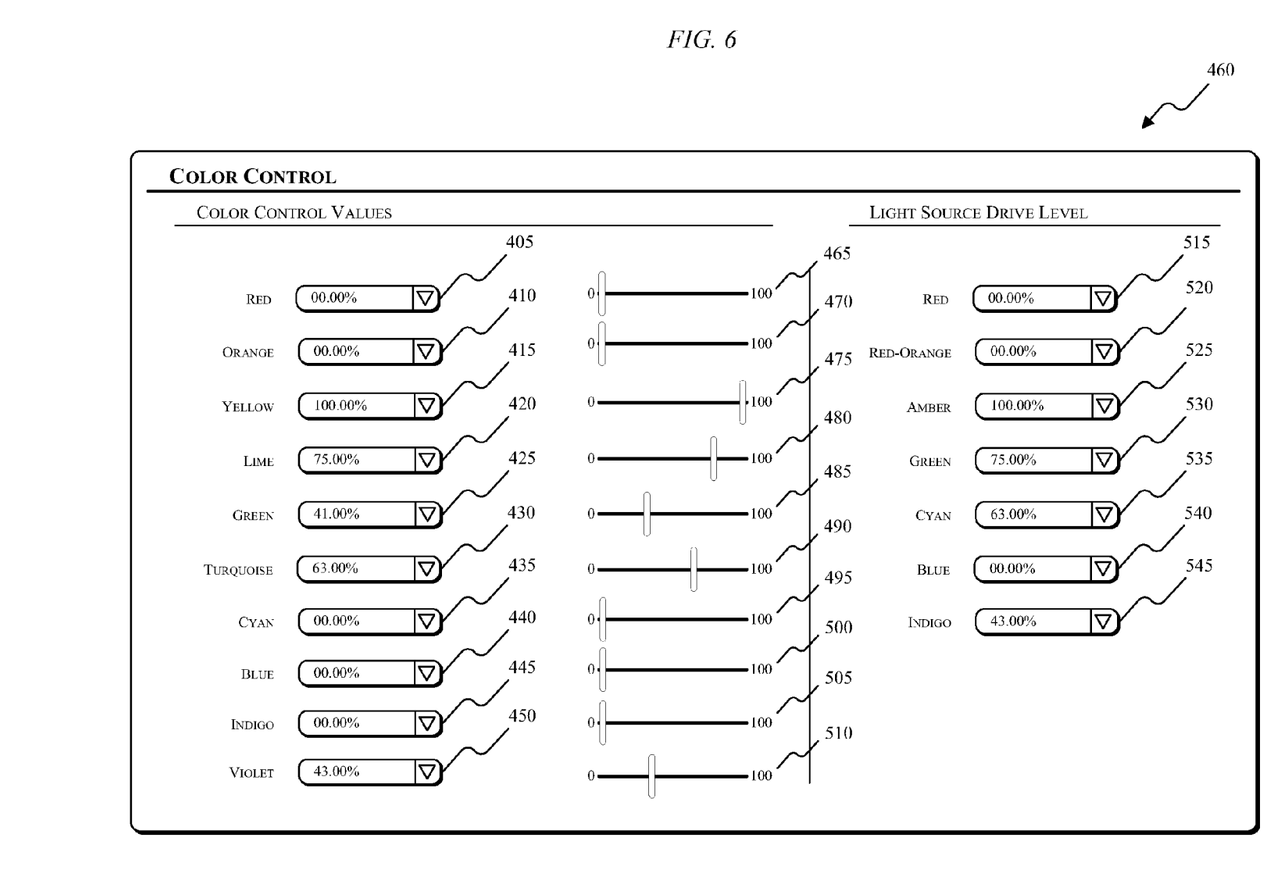
FIG. 6 illustrates a user control interface according to another construction of the invention.

FIGS. 4-6 illustrate various controller interfaces for setting and modifying one or more color controls. Each of FIGS. 4-6 illustrates controller interfaces that include ten color controls. In other implementations, the controller interface can include more or fewer color controls, or the number of color controls can be expanded or reduced by a user as needed or desired. FIG. 4 illustrates a controller interface 400 that includes a red color control 405, an orange color control 410, a yellow color control 415, a lime color control 420, a green color control 425, a turquoise color control 430, a cyan color control 435, a clue color control 440, an indigo color control 445, and a violet color control 450. The color controls 405-450 are illustrated as dials which can be turned between control levels or values of zero and one hundred percent (i.e., full-scale). FIG. 5 illustrates a controller interface 455 that also includes the color controls 405-450. However, the color controls in FIG. 5 are illustrated as faders that are slid up or down to adjust the control level for each color control. Like the dials in FIG. 4, the faders are adjustable between control levels of zero and one hundred percent.

FIG. 6 illustrates a virtual or digital controller interface 460 (e.g., a graphical user interface ("GUI")) that is displayed on, for example, a monitor or a similar display. The controller interface 460 is used in combination with or in place of one or more of the controller interfaces 400 and 455. The controller interface 460 includes input portions 405-450 for the ten color controls described above. Each of the input portions enables a user to populate the input portion with a desired control value (i.e., a percent). For example, the user populates the input portions of the controller interface 460 by entering text via a mechanical or virtual keyboard of a computer or similar processing device, and using a pointing or selection device such as a mouse to control a curser on the display. Input signals from the keyboard and the mouse are received, processed, and translated into a visual result or action in the interface. For example, if the user enters text using a keyboard, the activated keys produce signals which are represented as type-written text in the controller interface 460. Similarly, a mouse click, which corresponds to a location of the cursor on the screen, results in selecting/deselecting a dropdown menu, the position of a fader, etc. In other implementations, the controller interface 460 is accessed and controlled using a touch-screen device and a user's finger strokes or tapping are used to populate the input portions. In addition to manual entry and selections from a dropdown menu, the color control values are selectable or modifiable using a corresponding virtual fader 465-510 associated with each of the color controls 405-450. In some implementations, the controller interface 460 is connected to a controller interface such as controller interface 400 or 455, and the control levels displayed in controller interface 460 for each color control is set or modified using a physical dial, fader, or the like.

The controller interface 460 also includes the light source drive levels 515-545 for each of the light sources in a given fixture. As described above, a light fixture that includes red, red-orange, amber, green, cyan, blue, and indigo light sources is used. The displayed drive levels 515-545 correspond to the drive levels for each light source to achieve the output corresponding to the selected color control input levels. In some implementations, the light source drive levels 515-545 are individually controlled following the selection of the color control levels. The light source drive levels are modified by either manually inputting a new value or by selecting a drive level from a drop down menu. In some implementations, the color control values 405-450 are correspondingly modified following the modification of a light source drive level.

Thus, the invention provides, among other things, a color control interface and method for controlling multi-source luminaires. Various features and advantages of the invention are set forth in the following claims.

What is claimed is:

1. A method of controlling the output of a light source within a light fixture, the method comprising:
    receiving a first control input signal having a first control level and corresponding to a first control input characteristic;
    receiving a second control input signal having a second control level and corresponding to a second control input characteristic;
    determining a first separation value associated with a first separation between the first control input characteristic and an output characteristic of the light source;
    determining a second separation value associated with a second separation between the second control input characteristic and the output characteristic of the light source;
    setting a first light source output value based on the first separation value;
    setting a second light source output value based on the second separation value;
    controlling an output of the light source based on the first light source output value and the second light source output value; and
    normalizing the output of the light source based on the first light source output value and the second light source output value.

2. The method of claim 1, wherein the first light source output value for the light source is inversely related to the first separation value, and the second light source output value for the light source is inversely related to the second separation value.

3. The method of claim 1, wherein the light fixture includes four or more light sources.

4. The method of claim 1, further comprising scaling the first light source output value based on the first control level, and scaling the second light source output value based on the second control level.

5. The method of claim 4, wherein scaling the first light source output value includes multiplying the first light source output value by the first control level, and scaling the second light source output value includes multiplying the second light source output value by the second control level.

6. A system for controlling the output of a light source within a light fixture, the system comprising:
    a first control input device configured to control a first control level associated with a first control input characteristic;
    a second control input device configured to control a second control level associated with a second control input characteristic;
    a controller configured to
        determine a first separation value associated with a first separation between the first control input characteristic and an output characteristic of the light source;
        determine a second separation value associated with a second separation between the second control input characteristic and the output characteristic of the light source;
        determine a first light source output value based on the first separation value;
        determine a second light source output value based on the second separation value;
        control an output of the light source based on the first light source output value and the second light source output value; and
        normalize the output of the light source based on the first light source output value and the second light source output value.

7. The system of claim 6, wherein the light fixture includes four or more light sources.

8. The system of claim 6, wherein the first light source output value for the light source is inversely related to the first separation value, and the second light source output value for the light source is inversely related to the second separation value.

9. The system of claim 6, wherein the first control input device and the second control input device are one of a dial, a fader, or a graphical interface.

10. The system of claim 6, wherein the controller is further configured to scale the first light source output value based on the first control level, and scale the second light source output value based on the second control level.

11. The system of claim 10, wherein the controller is further configured to scale the first light source output value by multiplying the first light source output value by the first control level, and scale the second light source output value by multiplying the second light source output value by the second control level.

12. The system of claim 6, wherein the light source includes a light emitting diode ("LED").

13. The system of claim 12, wherein the LED is one of a red LED, a red-orange LED, an amber LED, a green LED, a cyan LED, a blue LED, and an indigo LED.

* * * * *